US006178991B1

(12) United States Patent
Schiwek

(10) Patent No.: US 6,178,991 B1
(45) Date of Patent: Jan. 30, 2001

(54) SAFETY CONTAINER FOR POTENTIALLY EXPLOSIVE AND/OR ENVIRONMENTALLY HAZARDOUS SUBSTANCES

(76) Inventor: Helmut Schiwek, Am Waldessaum 3, Duisburg D-47057 (DE)

( * ) Notice: Under 35 U.S.C. 154(b), the term of this patent shall be extended for 0 days.

(21) Appl. No.: 08/495,471
(22) PCT Filed: Jan. 7, 1994
(86) PCT No.: PCT/DE94/00009
§ 371 Date: Jul. 24, 1995
§ 102(e) Date: Jul. 24, 1995
(87) PCT Pub. No.: WO94/16972
PCT Pub. Date: Aug. 4, 1994

(30) Foreign Application Priority Data

| Jan. 23, 1993 | (DE) | 43 01 797 |
| Jan. 23, 1993 | (DE) | 43 01 798 |
| Jan. 23, 1993 | (DE) | 43 01 838 |
| Jan. 23, 1993 | (DE) | 43 01 839 |
| Jul. 23, 1993 | (DE) | 43 24 726 |
| Jul. 28, 1993 | (DE) | 43 25 219 |
| Jul. 31, 1993 | (DE) | 43 25 807 |
| Aug. 2, 1993 | (DE) | 43 25 884 |

(51) Int. Cl.[7] .................................................. A01G 25/09
(52) U.S. Cl. .................... 137/351; 137/899; 137/899.2; 220/62.19; 220/88.1; 220/563
(58) Field of Search ........................ 137/899, 899.2, 137/351; 220/62.19, 88.1, 563

(56) References Cited

U.S. PATENT DOCUMENTS

| 2,305,923 | * | 12/1942 | Held | 220/88.1 |
| 2,686,024 | * | 8/1954 | Zimmer | 137/899.2 |
| 3,650,431 | * | 3/1972 | Stewart | 220/88.1 |
| 4,433,020 | * | 2/1984 | Narukama et al. | 428/408 |
| 4,615,455 | * | 10/1986 | Tansill | 220/88.1 |
| 5,466,379 | * | 11/1995 | Schiwek | 210/680 |

FOREIGN PATENT DOCUMENTS

| 1104074 | 6/1981 | (CA) . |
| 680737 | 9/1939 | (DE) . |
| 2122792 | 9/1972 | (FR) . |
| 2129815 | 11/1972 | (FR) . |

* cited by examiner

Primary Examiner—A. Michael Chambers
(74) Attorney, Agent, or Firm—James Creighton Wray; Meera P. Narasimhan

(57) ABSTRACT

Large amounts of hazardous goods, especially liquid ones such as fuel, may be carried in safety containers, whether tank semitrailers, oil tankers, containers for hazardous goods or aircraft, and be transported with practically no risk for the environment, by completely filling the inside (10) of the container with glass wool, so that the hazardous materials or other fillings dispersed therein may not escape or be somehow spilled in the environment. The liquid components, for example hydrocarbons, are absorbed and held by a dense, water-proofed latticework (15), so that no oxygen can reach them. They are thus protected against explosions and spillage in the environment. At the same time, a safety container of this type acts as a kind of safety buoy, preventing water from entering the inside (10) of the container, so that the kerosene, gasoline or oil contained therein further increase buoyancy. As a whole, a simplification of the safety container design and a considerable increase in safety may be noted.

43 Claims, 7 Drawing Sheets

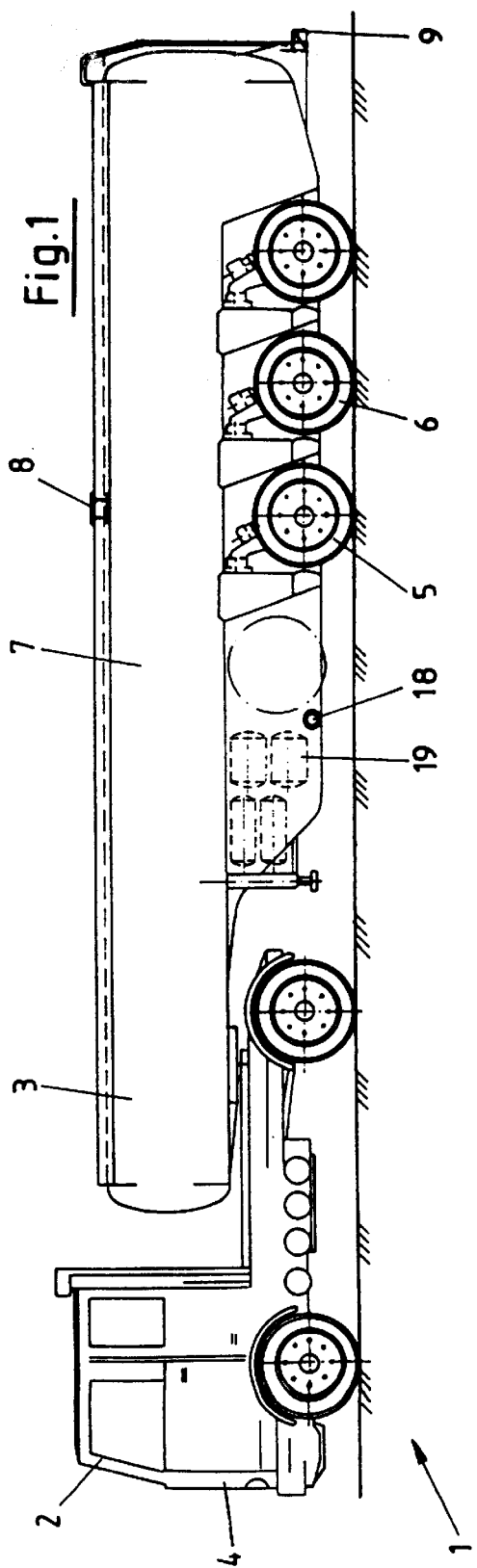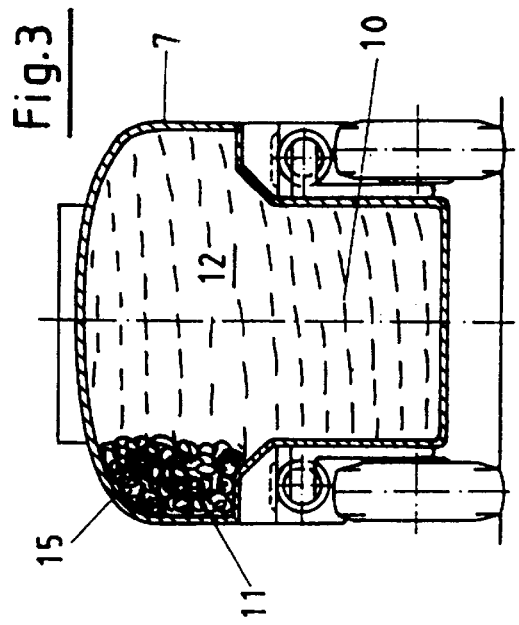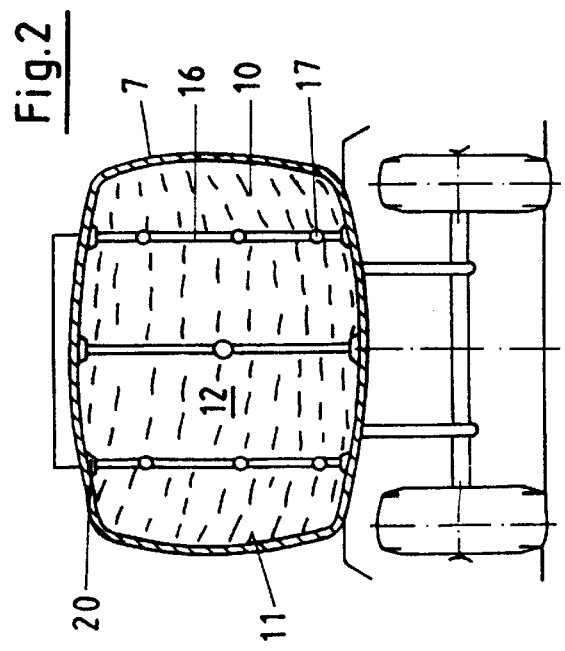

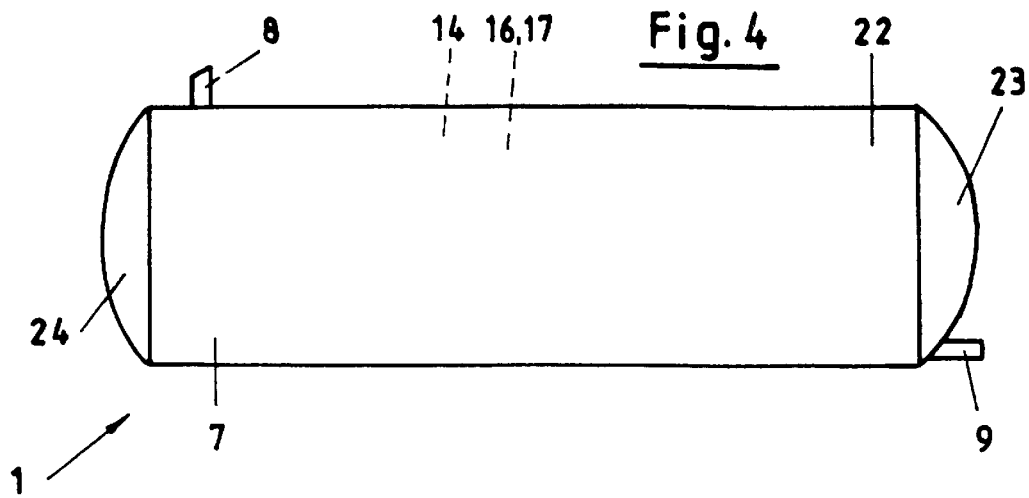
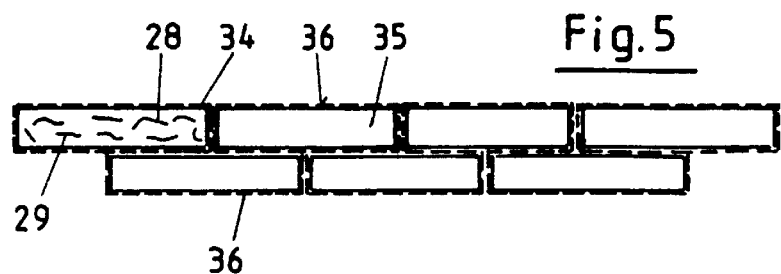
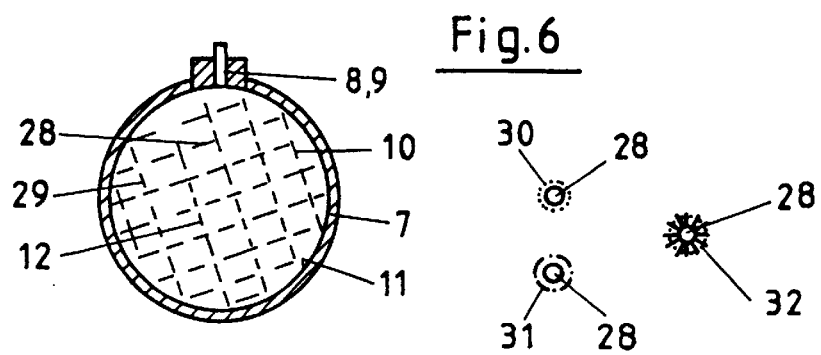
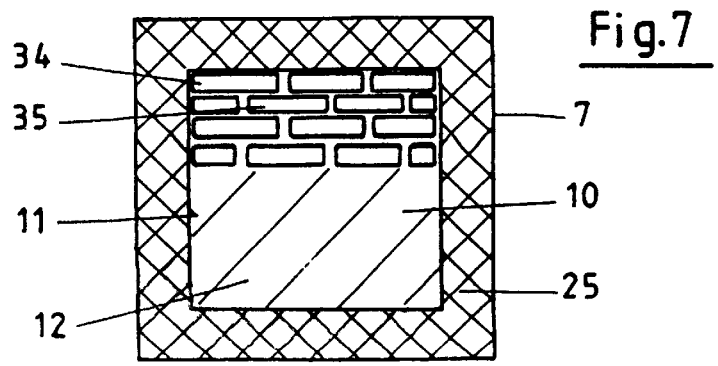

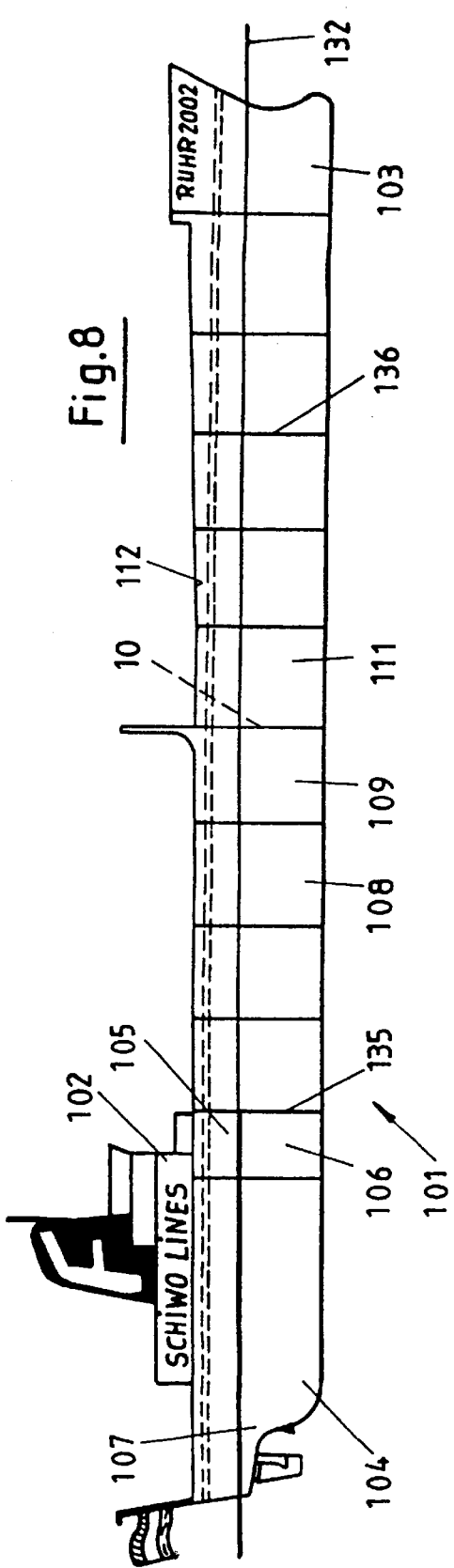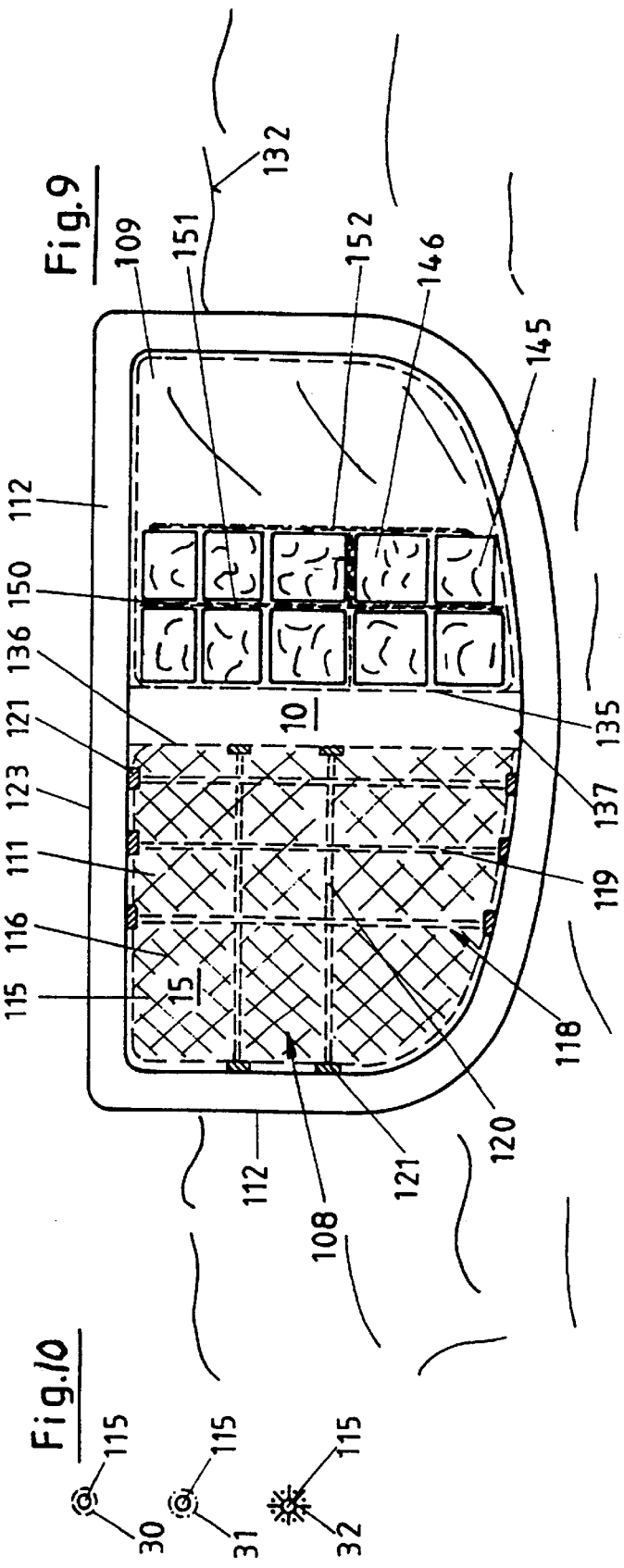

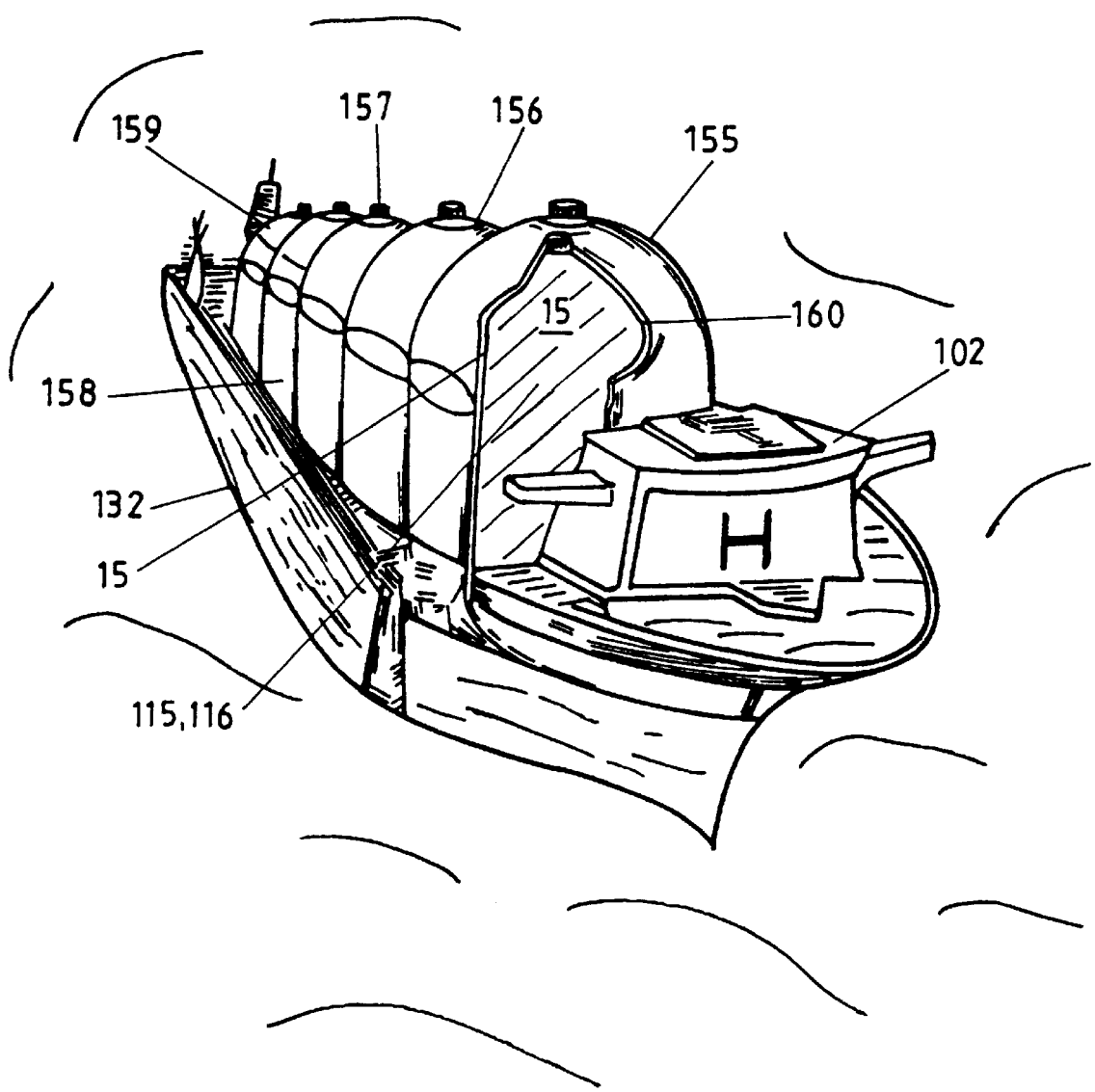

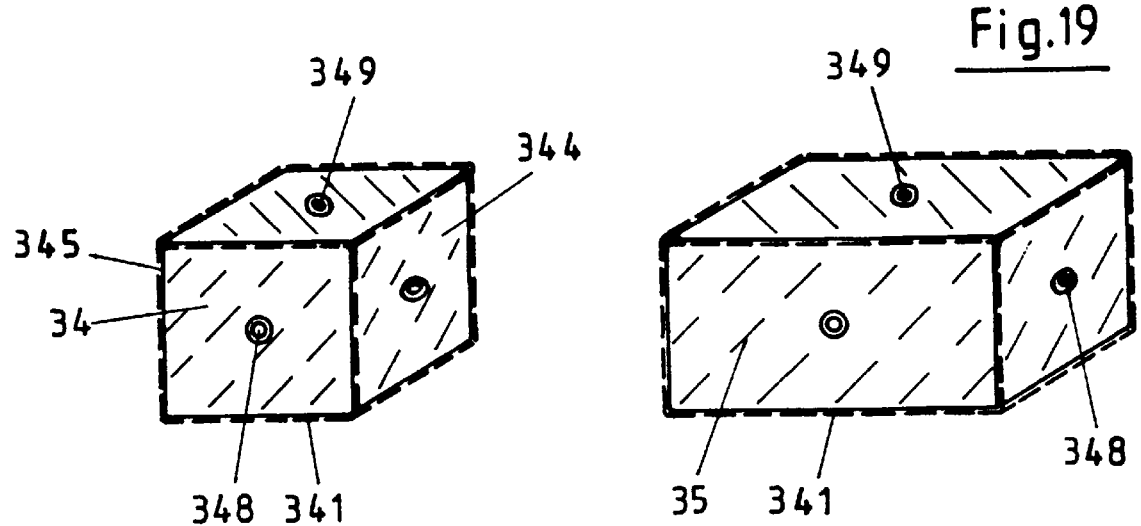

SAFETY CONTAINER FOR POTENTIALLY EXPLOSIVE AND/OR ENVIRONMENTALLY HAZARDOUS SUBSTANCES

BACKGROUND OF THE INVENTION

The invention relates to a safety container for storing and transporting environmentally hazardous, in particular explosive substances, such as gasoline, oil, hydrogen, and other fuels, consisting of an extended container closed on all sides, which is provided with filling and emptying devices or openings, and which is integrated into a transport vehicle or associated with such.

As a result of the legal regulations existing in the Federal Republic since 1976, containers, and in particular safety containers transported on or in vehicles, must be identified with warning labels if they contain hazardous goods. An important reason for this is that the hazardous goods, such as gasoline and oil, which are mostly transported in such vehicles having the form of tank trucks or safety trucks, are able to significantly damage the environment, in particular ground water, in case of an accident involving the vehicle or a leakage of the safety container. In addition, the leaking gasoline may burn or even result in an explosion. Especially in view of the large volumes transported with such tank trucks, special safety precautions are required. Tank trucks with a content of 35,000 liters or more must even drive on roads which are not in a perfect state or which are not even reinforced. The content of the container, especially if the container is not 100% filled, hereby starts to swing, which may significantly affect the vehicle's driving safety. In order to avoid these swinging movements, it is a known practice to provide such containers with internal structures, i.e. in particular so-called surge walls. The disadvantage of these surge walls is that they must be arranged at very short intervals, or otherwise they will have an insufficient effect. In addition, however, these safety containers, if they contain gasoline or other hydrocarbons, pose an explosion hazard at the same time, i.e. as soon as the leaking transported material comes into contact with fire. The same is true for aircraft, and in particular for tankers, whereby the latter, as a result of the present enormous transport volumes, lead to huge environmental catastrophes when damaged.

SUMMARY OF THE INVENTION

The invention is thus based on the objective of creating safety equipment for hazardous materials containers, in particular for aircraft, ships, tank trucks, etc., whereby said safety equipment contributes to the necessary safety against leakage and explosion of the transported material or guarantees the same without complicated design and construction.

According to the invention, this objective is realized in that the container interior is filled wholly or in part with glass wool blown in the high temperature range, and/or is covered with a layer of this material, in that the glass wool is coated with a binder consisting of a long-chained starch (polysaccharides) and/or an epoxy and/or methylon resin, hardener, methylpolysilane, and a dust-collecting agent, as well as silicone (silicone resin), and is shaped into a cuttable, mat-shaped latticework adapted to the container inside, the container interior walls, or parts of either.

In a safety container constructed in such a way, a swinging movement is not even able to develop because of the mat-shaped latticework filling the container. Rather, the hazardous substance is, on being filled, in a way imbedded into the latticework, so that it then essentially only follows the movements of the vehicle or respective container, while the described swinging movement can no longer occur. The construction according to the invention also has the great advantage that in case of a leak or even an accident with the container, the hazardous material is unable to leak out, since it is retained in the mat-shaped latticework. This prevents danger to the environment caused by leaking oil or leaking gasoline or similar hazardous substances. The means for realizing the object of the invention thus result in a multiple effect which safeguards the operational and driving safety of such a container, in particular of a tank vehicle. The latticework per se is integrated into the container interior in such a way that it approximately fills the latter. The unexpected result here is that the filled-in latticework, which consists of very thin glass fibers, nevertheless results in only a small loss in volume. The transported hazardous material filled into the container interior is at the destination pressed out of the latticework with compressed air, etc., so that the vehicle is then again available for transporting more hazardous material. A changing of the container filling, i.e. of the latticework, is hereby not necessary. Even if a hazardous material not identical to the originally transported one is supposed to be transported, it only needs to be washed out by suitable measures, and no replacement is necessary. But according to the embodiments described below, a replacement, should it become necessary for any reasons, is also possible without any problems.

In order to prevent a slipping of the latticework placed into the container interior, the invention provides that the mat-like latticework is clamped into the container interior or is placed and arranged so as to be supported by supports consisting of rods or fiberglass strands or walls positioned there. These fiberglass strands or walls have the advantage that they do not impede the diffusion of the hazardous material, so that always suitably large containers are available for transporting such hazardous materials. It should be understood that it is also possible, if required, to divide such a container, e.g. tank container, into partial containers by means of suitably introduced or provided dividing walls.

It has already been pointed out above that compressed air can be used for emptying such safety containers. Accordingly, the invention provides that the container interior is connected via filling and emptying devices with a compressed air connection or inert gas connection or inert gas container. The introduced compressed air presses the hazardous material out of the mat-shaped latticework, without leaving behind significant residues. If, for instance, a hazardous material which reacts with oxygen is transported in the container, it is advantageous if, instead of the compressed air, an inert gas is used, for which purpose, according to the invention, a corresponding inert gas container or at least inert gas connection is provided. The inert gas container may be placed inside the vehicle, since it is able, during the filling of the hazardous material, to automatically accept the inert gas again, and after this ensures that the hazardous material is removed again. The necessary pressure is hereby created in that the hazardous material is introduced into the container under pressure. But it would also be conceivable to use new inert gas for each discharge process. In addition, the gasoline fumes released by the evaporation of the gasoline can be collected and used for the "squeezing out" of the gasoline.

An almost optimum filling of the hazardous material container or safety container is achieved in that the glass wool forming the latticework is coated with 7–10 wt. % of a binder consisting of silicone and starch or epoxy resin and is shaped into plates or bodies with a volume density (raw density) of 18 to 110 kg/m³, preferably 40 to 65 kg/m³. The advantage in bodies constructed accordingly is that these can be safely pushed into the container and as a rule do not require a support structure. Since the latticework is deflected and cut in accordance with the dimensions of the container interior, it can be ensured that the mat-shaped latticework also fills the entire hollow space of such a container. The respectively coated glass wool is able to hold and store the hazardous material, such as oil or gasoline, whereby the binder components which are used form an intimate connection, so that neither oil nor gasoline nor any other hazardous materials are able to dissolve them. This ensures a permanent high storage capacity of the mat-shaped latticework and, as already mentioned, ensures that the hazardous materials are practically unable to escape if the container is damaged.

The high storage capacity is ensured in particular in that the glass wool forming the latticework consists of glass fibers (soft glass wool) with a fiber diameter of 3 to 7 μm, and that the latticework is pushed together with the telescopically constructed supports and their associated sole plates into the container interior. The latter has been provided so that especially in the case of low volume densities the overall latticework is provided with the necessary stability. Simultaneously, the supports may hereby also be used for the distributed introduction of the compressed air into the container, thus accelerating the manner of drainage or emptying of the safety container. In addition to silicone and starch, it is also possible to use mixtures of silicone resins and latex or similar components as a binder for the mat-shaped latticework, whereby these substances are preferably environmentally compatible and ensure the described storage properties of the mat-shaped latticework. The sole plates on the supports which rest against the inside walls of the container are provided in order to facilitate the pushing in of a continuous support frame. This support frame hereby advantageously prevents a swinging movement of the filled-in hazardous material, even during extreme movements.

In order to facilitate the filling of the glass wool or glass fibers into such containers, it may be advantageous that the glass wool and thus the glass fibers forming it are surrounded like packets with a thin glass fleece or bands consisting of glass fibers, whereby silane is added as a binder additive to the epoxy resin or a resin functioning in the same or similar manner. The silane acts as a catalyst on the organic and inorganic components of the emulsion. The coating with glass fleece or the application of corresponding bands expands the application range of such safety container fillings.

In cases where liquid gas, for example, is supposed to be transported and stored, it may be advantageous to even provide different raw densities within the glass wool bodies pushed into the container, whereby it is provided especially for the liquid gas, that the container interior is filled from the outside towards the inside with latticework layers of decreasing volume density (raw density). In the outer range, a particularly dense mat is provided, which makes a penetration of oxygen significantly more difficult and ensures that risky situations are prevented even in cases of accidents, so that the liquid gas can be permanently kept liquid.

In particular for tankers and similar ships, it is advantageous if the container interior of the compartmental tank spaces and operating oil tanks, as well as the coffers or dividing walls which are constructed as double walls, and the bottom of the bilge are filled with the mat-shaped latticework of correspondingly constructed and coated glass wool. In a ship constructed accordingly, the mat-shaped latticework filling the individual tanks and hollow spaces prevent a swinging movement of the liquid content, and primarily an unintentional discharge can be considered almost impossible, even if the exterior wall is damaged. The reason for this is that the glass wool or corresponding mat-shaped latticework filling the hollow space collects and holds the oil and similar liquid products, and releases them only when special pressure means, e.g. compressed air, is applied. This unexpectedly ensures that oil and similar hydrocarbons, especially those transported in oil tankers, do not escape into the environment if the oil tanker is damaged. It is surprising that this special construction of the compartmental tank spaces or entire ship achieves a floating aid for such ships, which cannot even sink if collisions occur, since the oil or other fuels retained by the mat-shaped latticework act, together with this latticework, as a floating aid. Naturally, the empty weight of a tanker or other ship is increased by the added glass wool, but to a completely justifiable extent, whereby this disadvantage is more than compensated by the fact that the transported liquid products cannot leak. For loading and unloading the oil tankers, but also individual oil tanks on freighters pump systems, i.e. loading and unloading devices are provided. These loading and unloading devices can be activated in such a way that they e.g. press compressed air, etc., into the tank during the unloading of a tank, in order to push out the oil or other product on the other side. Along with the pumping in of the oil during the filling of the respective tank, the compressed air contained in it is simultaneously released, ensuring a very even and calm filling of an oil tank.

To empty such tanks more quickly, it is advantageous that the supports are constructed as pipes, provided with crossbores, and connected with the loading and unloading device. This enables a specific, faster emptying of the individual tanks or simultaneous discharge of several tanks, depending on what is useful and necessary.

Oil tankers which lose oil in spite of the glass fiber latticework mats filled into the tanks are unable to cause environmental damage, if on the container outside, especially in the ship wall, barrier chambers are provided which are closed with flaps opening towards the outside, in which barrier chambers a centrifugal device and an oil barrier consisting of a latticework shaped into rolled latticework glass mats are provided. This latticework or the rolled latticework glass mats can be provided with a mantle of a fiberglass weave in order to be able to better centrifuge out the material and hereby safely prevent a tearing off. This also makes it easier to recover the oil barriers. The fiber glass mantle permits the oil to pass through, especially if it is provided at certain intervals with apertures or holes.

The filling in of the latticework is accelerated in that the individual tanks are filled with packets of glass fibers, and that in addition the cooling mantle surrounding the tanks is also provided with mats of glass fibers. The latter are a special embodiment, in so far that such tankers can also be used to transport liquid gas and in particular hydrogen without the risk that this hazardous material will be able to escape. At the same time, the filled-in latticework results in a calm transport, without requiring surge walls, etc., to be installed. The additional arrangement of the fiberglass mats even in the cooling mantle enables a better retention of the coolant, so that here also material can be used which, while having good properties, tends to burn, so that the use of coolants is possible in such tanks and tankers to a further extent. The latticework used here thus achieves a double effect in that it contributes both to the better retention of the coolant and hazardous material, but also enables the use of cheaper and better coolants.

For transporting solid hazardous materials or hazardous materials filled in smaller containers, such as e.g. vats, a solution is provided according to which the container interior which has been wholly or partially filled with hazardous material is surrounded by a protective mantle or an additional external mantle consisting of the latticework or containing this latticework surrounded by a sheet metal, plastic or fiberglass mantle, whereby the mantle is perforated on the side of the hazardous material. In this way, such a latticework may possibly also hold escaping hazardous material, preventing the risk that the latter reaches the environment. This is especially advantageous for the transport of chemicals and similar liquids which may escape into the environment if the actual container is damaged. The long-chained starch and the silicone resin or similar binder also ensures here the long-term binding of the chemicals, preventing their unintentional release into the environment. By means of the sheet metal or plastic mantle arranged on the outside, the stability of the latticework can be increased if the latter does not have or is not supposed to have the necessary stability. In addition to starch, various resins are also suitable for producing such a properly hydrophobic fiberglass mixture. It would also be conceivable to make a fiberglass weave hydrophilic in order to specifically absorb water, so that the latter cannot escape. This is of particular importance if water which has become radioactive, or a similar liquid, must be transported, and if leaks could possibly occur during such a transport.

In cases where different hazardous materials must be transported, or where at different times such hazardous materials must be transported in the same containers, it is advantageous that the protective or external mantle is provided with a double chamber, whereby the chamber facing the hazardous material is filled with a latticework made hydrophilic, and the outer chamber is filled with a latticework made hydrophobic. Depending on the respective hazardous material, the reverse arrangement can be made, whereby, depending on the respective design, even an exchange is possible, so that in this manner different hazardous materials can be transported with the same protective mantle. The hydrophilic latticework ensures, for example, that aqueous hazardous materials cannot be released into the environment, while other hazardous materials which possibly have been transported with them and adhere to them are able to pass through the water into the outer protective mantle and are held and stored there. This provides a very versatile and safe design of a protective mantle, which is also characterized by a relatively simple design. The storage capacity of the latticework is known or can be calculated, whereby a multiple of its weight can always be held, if, as provided according to the invention, correspondingly thin glass fibers and correspondingly coated glass fibers are used. In cases where the stability of such a latticework is inadequate for whatever reasons, a support frame of pipes or double plates which has guide parts on the ends at the wall side should be provided additionally to the latticework, as already mentioned. By means of these guide parts, the support frame which is integrated into the latticework can be pushed in its entirety e.g. into a corresponding container, performing the described function there. Just as well, the latticework can be pushed in this manner into a mantle surrounding the hazard space.

In modern airliners, particular such with jet propulsion, significant fuel volumes are stored in the aircraft itself in order to increase their range. The accommodation of all essential fuel tanks in the wings has proven itself here for a long time. For example, more than $2/3$ of the necessary fuel is stored in the wings, while usually less than $1/3$ is stored in the part of the fuselage between them. To keep the aircraft balanced, a constant compensation must be performed between the individual wing tanks, requiring intensive control of the entire process. In order to avoid this constant exchange and, on the other hand, to make such aircraft safer, it is provided that the container interior of the fuselage tank which is extended both in the direction of the cockpit and the tail is, like the wing tanks also, filled with the mat-shaped latticework of suitably constructed and coated glass wool which is clamped in between the tank walls with a volume density of 45 to 55 kg/m$^3$. In this way swinging movements can be compensated and an unintentional escape of the kerosine should be considered almost impossible again, since the glass wool or corresponding mat-shaped latticework filling the hollow space catches and holds the kerosine and releases it essentially only after e.g. compressed air is applied. This unexpectedly also ensures that in compromising situations a possible fire is inhibited and even an explosion is impeded to such an extent that no significant damages need to be expected. Here, as in other safety containers, this explosion safety is achieved in that the penetration of oxygen is prevented, so that only the edge area can be influenced. Particularly advantageous for aircraft is that the numerous dividing walls in the tanks are no longer required, since the latticework supports itself on the tank walls and is clamped in so that it is unable to slide back and forth inside the tank. The weight of the glass wool filling the tanks indeed increases the aircraft's own weight; but this disadvantage is compensated by the fact that the numerous dividing walls and overflow pipes and similar devices are no longer necessary. The usual loading and unloading devices are provided for filling and emptying the tanks, whereby the former are operated, for example, so that they e.g. push compressed air, etc. into the tank while the fuel is being pumped out. While during the reverse process the kerosine is pushed out via the introduced compressed air, the compressed air is pushed out by the introduced kerosine during the reversed process. It is also advantageous that already during the filling of the kerosine or other fuel, a balancing of the filled-in latticework is performed, so that a continuous exchange, like the one performed in the past between the individual tanks, is not necessary. Another advantage is that in this way much more storage space or tank space is available in the fuselage area, whereby the already described complicated pressure and weight compensations between the individual wings are no longer necessary.

It has already been described above that ships are no longer at risk as much, because the filled in glass wool material retains the oil and other fuel and thus forms a floating aid. This floating aid can also be achieved for aircraft in that the entire ship wall or wall surrounding the cabin is filled with a fiberglass latticework coated with a highly hydrophobic binder, whereby a suitable material increasing the buoyancy, e.g. kerosine, is filled into these parts.

For a faster exchange of the kerosine or fuel, but also for a faster filling and emptying, it is provided that the container interior is divided with double plates which are arranged so as to support themselves on the tank walls and are provided with outlet openings and are connected with the compressed air or inert gas supply. In this way, compressed air or inert gas can be pushed in simultaneously from several points, thus accelerating the unloading process or the transport to the engines.

The invention is characterized in particular in that a safety container for aircraft, ships, and also hazardous material containers for tank trucks is created, which has significant advantages in respect to safety, whereby these advantages are in particular that an even filling and emptying of the individual containers is possible. At the same time, the latticework inside the containers makes it possible, by means of a corresponding pushing in of compressed air or inert gas at the respective points, for the containers to always be unloaded evenly, so that the balance, e.g. of the aircraft, is not affected negatively. At the same time, a support frame in the latticework makes it possible for the unloading process in tanks, etc. to be accelerated. In addition, the dividing walls can be either eliminated or reduced, so that the increase in weight as a result of the fiberglass weave can be compensated. Other advantages are that the filled-in fiberglass enables an explosion and fire inhibition which has an especially advantageous effect in tank trucks, ships and aircraft. The latticework in the tanks furthermore ensures that in case of a water landing of the aircraft or leaking of the ship, sinking is impossible, since the latticework ensures that even in damaged tanks, so to speak, a floating aid is generated. This multiple effect is unexpected and can be called a technological jump.

Other details and advantages of the subject of the invention result from the following description of the associated drawing, which shows a preferred embodiment with the necessary details and parts. In the drawings:

BRIEF DESCRIPTION OF THE DRAWINGS

FIG. 1 shows a lateral view of a tank truck,

FIG. 2 shows a section of a tank truck,

FIG. 3 shows a section of a tank truck with a lower tank chamber,

FIG. 4 shows a side view of a stationary tank,

FIG. 5 shows several such latticework packets which can be pushed into such a tank, FIG. 6 shows a section through the stationary tank according to FIG. 4, and a section of several glass fibers, FIG. 7 shows a section of another stationary tank, FIG. 8 shows a side view of an oil tanker, FIG. 9 shows a section of an oil tanker, FIG. 10 shows a section of several glass fibers, FIG. 11 shows a perspective view of a tanker intended for transporting hydrogen, FIG. 19 shows glass fibers combined into packets, FIG. 20 shows a section of a fuel tank with pushed-in glass wool packets.

DETAILED DESCRIPTION OF THE PREFERRED EMBODIMENTS

Figure 12:
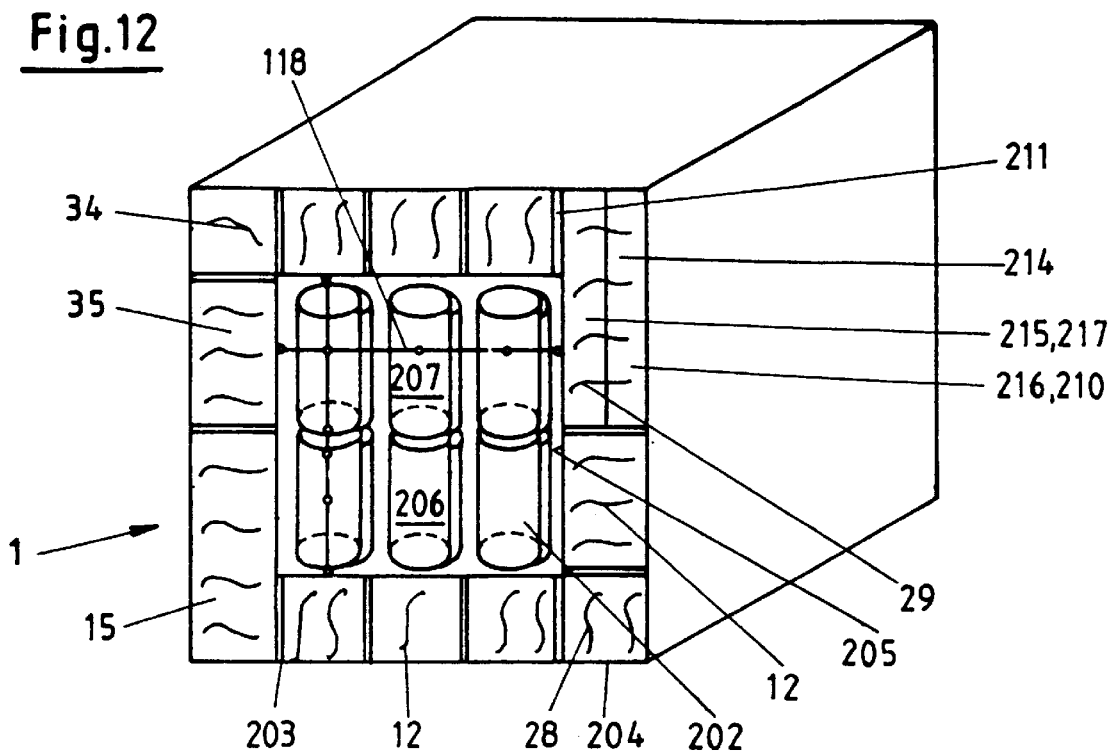
FIG. 12 shows a perspective view of a hazardous material container.

FIG. 1 shows a safety container 1, here in the form of a tank truck 1, in which the driver's cabin 2 or the tractor 4 and the tank semitrailer 3 are connected with each other by means of the pivot associated with the trailer plate.

The tractor 4 can be driven separately with its wheels, while the entire tank semitrailer with its wheels 5, 6 can only be driven in connection with the tractor 4. Such tank trucks and the connection with the tank semitrailer are known.

The tank semitrailer 3 is provided with a container 7 having a large filling volume. In the embodiment according to FIG. 1, a container volume of approximately 35,000 liters can be achieved. 8 stands for a filling device, 9 for the emptying device through which the container content can be influenced.

FIG. 2 shows a section through such a tank truck at the height of the wheels 5, 6, whereby FIG. 2 shows a standard tank truck 1, that is, one with a relatively high center of gravity. The entire container inside 10 of this tank semitrailer 3 or container 7 is filled up to the container inside wall with glass wool 12.

This glass wool 12 has been shaped by corresponding treatment with a mixture of long-chained starch and silicone into a mat-shaped latticework 15. This mat-shaped latticework 15 is supported, as FIG. 2 illustrates, on the container inside wall 11, so that as such it must follow the movements of the container 7.

In order to strengthen the mat-shaped latticework 15, in particular if the latticework is supposed to have only a low volume density of e.g. 18 kg/m$^3$ or less, built-in elements 14 are provided according to FIG. 2. These built-in elements 14 consist of supports 16, 17 provided with sole plates 20 in order to achieve a safe connection or support on the container inside wall 11. The built-in elements of the supports 16, 17 are supplemented with supports extending at a right angle to them and not shown here, whereby the sole plates 20, for example, can be constructed so that the pushing in of the entire built-in elements 14, including the latticework 15, can be accomplished from one side of the more or less tubular container 7. In this way the entire content, including the mat-shaped latticework 15, can be removed again from the container interior 10 without problems, if required, and can be replaced with another latticework.

In order to facilitate the discharge process, compressed air connections 18 are provided at one or more points, through which the compressed air or inert gas can be introduced into the container interior 10. If inert gas is to be used, inert gas containers 19, in particular in the drivable embodiment of the tank truck according to FIG. 1, can be easily attached to the chassis. The inert gas is introduced from the inert gas container 19 via a compressed air connection 18 into the container interior 10 and also may be pumped back into the inert gas container 19 during the filling process, e.g. with gasoline, thus being available again for another discharge process.

The container 7 shown in FIG. 3 differs from that in FIG. 2 in that it is pulled down further, into the area of the axles. This is possible if a corresponding forked construction of the frame is used. The container interior 10 here is also filled with glass wool 12 in such a way that an overall explosion- and leakage-safe container for such liquid fuels is obtained.

The container shown in FIG. 6 corresponds to that of FIG. 1, except that it is arranged stationary and consists of a round body 22 which is provided on both ends with a face plate 23, 24. 8 and 9 stand for the filling device and the emptying device. Such a container can be used, for example, in a home as a heating oil tank. Instead of the more or less unordered pushing in of the glass wool 12 into such containers, it is, however, also possible to combine the glass fibers 28, 19 via the binder 39, 31, 32 in such a way that they are combined into packets 34, 35. These packets 34, 35 may hereby be covered with a glass fleece 36 in order to increase the stability of the individual packet 34, 35 in this manner.

The glass fibers 28, 29 in the form of packets 34, 35 are then, for example according to FIG. 6, pushed into the container interior, forming a complete filling. Surge walls or similar elements are absolutely not required any longer here, if the arrangement seen in FIGS. 2 and 3 is chosen.

FIG. 6 shows on one side the glass wool packet 12 or 34, 35 pushed into the container interior, and on the right side several glass fibers 28, 29 with different coatings. The binder 30 consists essentially of epoxy resin or similarly acting or compounded resins, the binder 32 of epoxy resin and starch, whereby depending on the application the starch content may be up to 100%. 31 is a binder of silicone and starch, whereby silicone is also contained in the other binders 30, 32 in order to make the fibers hydrophobic.

FIG. 7 finally shows an embodiment in which packets 34, 35, with or without glass fleece 35, again are pushed into the container interior 10. This container is also provided with a mantle of insulating material 25, e.g. if the transported material filled into the container 7 is supposed to be kept cool.

FIG. 8 shows a side view of an oil tanker 101, whereby 102 stands for the pilot house and 103 for the bow room, and 104 the stern room. Packets of glass fibers 28, 29 or 115, 116 reaching up to inside wall 112 have been pushed both into the operating oil tanks 105, 106 and tank spaces 108, 109 and the coffer 110 as well as tank space 11. This is shown in a section in FIG. 9, whereby FIG. 10 shows the glass fibers covered with different binders 30, 31, 32.

The section according to FIG. 9 additionally shows that it is useful that in the spaces, which are large here, a support frame 118 is pushed in together with the glass fibers 115, 116. This support frame consists of longitudinal pipes 119 and transverse pipes 120, whereby these have on their ends plates 121 which are supported on the inside wall 112 of the respective tank chamber 111. This provides the entire filling of tank space 111 with adequate stability, whereby this would also be conceivable through the embodiment shown on the right side, where the individual glass fibers 115, 116 are combined into packets 145, 146 and can be arranged in the tank space 111 held by fiber dividing walls 150 or fiberglass strands 151, 152. Since the main part of the tank space 111 is located below the water line 132, the ship wall 123 has been constructed correspondingly stabile. The dividing walls 135, 136 in contrast do not need to be that stabile. The individual packets 145, 146 are also arranged in the area of the bilge 137, where there is no tank space, in order to hold material or liquid possibly containing oil. The packets hereby result in a selection, in as far as only oil is taken up, while the water continues to remain unchanged in the bilge 137. Analogously, it would also be conceivable to equip the bottom in the area of the engine room 107 with such fiberglass mats, so that no such risks can occur due to leaking oil.

FIG. 11 shows a special embodiment of a tanker ship, which is designed to transport hydrogen. This hydrogen is transported in liquid form, i.e. properly cooled. The individual tanks 155, 156, 157, 158, 159 are surrounded by a cooling mantle 160 with the proper thickness, whereby both the cooling mantle 160 and the tank interior of tanks 155 to 159 are filled with glass fibers 115, 116 or a corresponding latticework 15. This results in significant improvements, better cooling performance, and in particular protection of the environment, since it ensures that even in case of possible accidents the environment cannot be endangered, because the liquid hydrogen does not escape suddenly and rapidly, but only very slowly, since the latticework 15 of glass fibers 115, 116 allows oxygen to reach the latticework 15 only very slowly.

Figure 13:
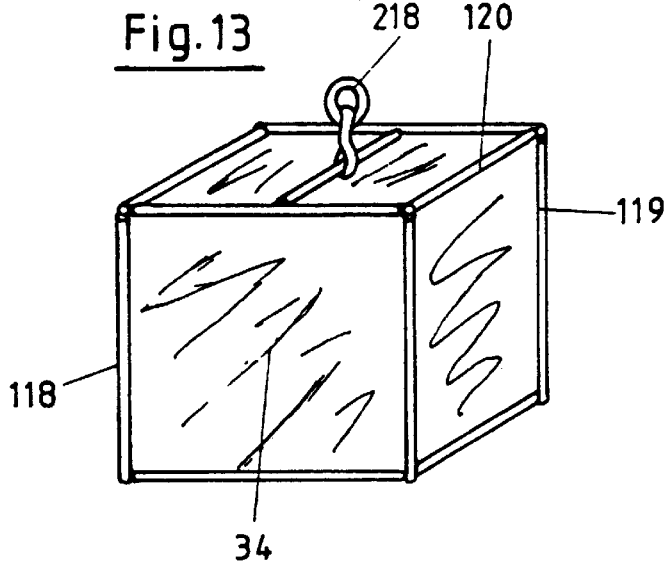
FIG. 13 shows a fiberglass packet which can be pushed into the wall.

Hazardous material 202 is very frequently also transported with special precautionary measures by road, air or ship. Here a special protection according to the invention is possible by means of the embodiment shown in FIG. 12, whereby the hazardous material 202 according to FIG. 12 is surrounded by a protective mantle 203. In addition, an external mantle 204 is possible, whereby both possibly may be filled with glass wool 12. This glass wool 12 in the form of latticework 15 creates a dense and stable mantle around the hazardous material 202, which is here stored in vats 206, 207 which are supported on the inside wall 205 or rests against it. The latticework 12 can be inserted prefabricated in the form of packets 34, 35, whereby FIG. 13 shows such a packet 34 in more detail. This packet is here stabilized additionally with longitudinal pipes 119 and transverse pipes 120, which also make it possible to attach a carrying loop 218 so that the individual packets are easier to transport in this way. The protective mantle 203, 204 is then formed from the individual packets 34, 35, whereby connection loops or attachment means may be provided for connecting the individual packets with each other.

Figure 15:
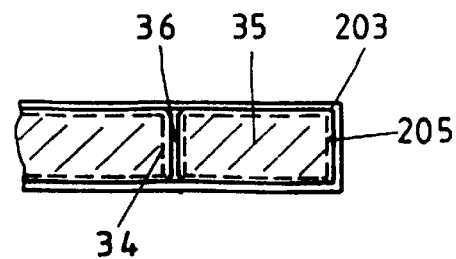
FIG. 15 shows a section through the chamber wall.

FIG. 12 and 15 show a special embodiment, to the extent that here a double mantle or chamber 214 is provided. This double chamber 214 may hereby be covered with a mantle 211 of e.g. glass fleece or sheet metal or similar material, whereby, especially towards the inside of the safety container, holes, etc. should be provided in order to enable the entrance of leaked hazardous material. It would also be conceivable here that emulsions are transported, or even radioactive liquid products, which then can be collected separately, since the inner chamber 215 is filled with a hydrophilic latticework 217, while the outer chamber 216 is filled with a hydrophobic latticework or a latticework 210 which has been made hydrophobic. As a result, the inner chamber accepts aqueous products, while the outer chamber 216 accepts oil-containing and hydrocarbon-containing products while preventing them from escaping into the environment.

Figure 14:
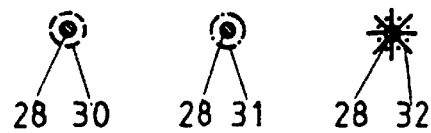
FIG. 14 shows a section of several glass fibers.

FIG. 14 again shows a section of several glass fibers 28, 29 coated with different binders 30, 31, 32.

Figure 16:
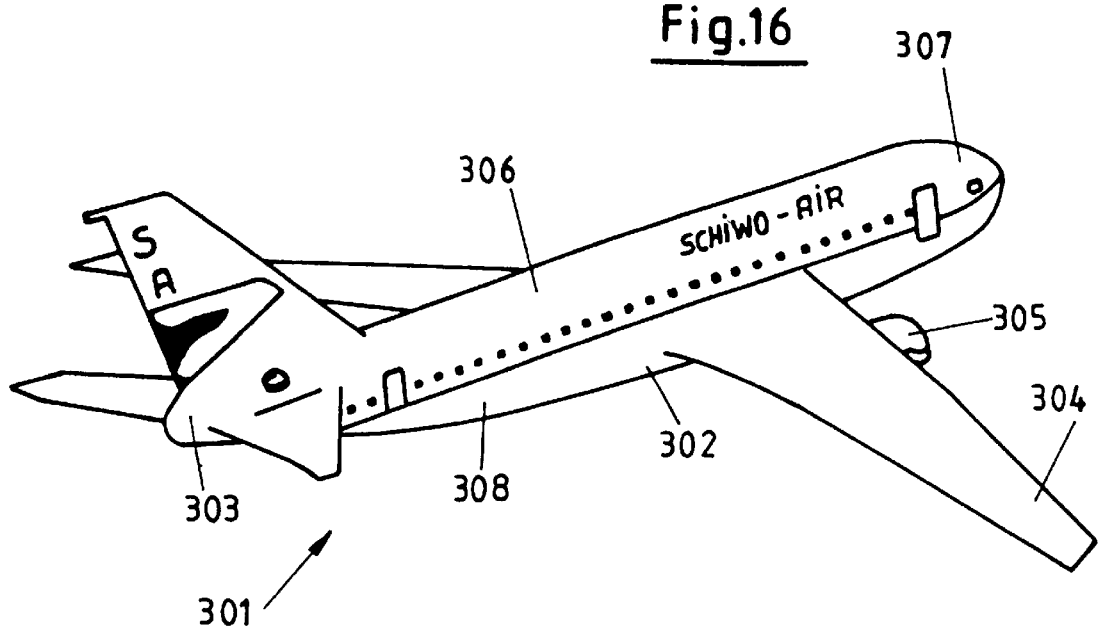
FIG. 16 shows a perspective view of an aircraft.

FIG. 16 shows an aircraft 301 of the imaginary airline SCHIWO-AIR which is equipped with tanks both in the fuselage 302 between tail 303 and cockpit 307, as well as in the wings 304. The engines 305 are located below the wings 304. Both in and below the stowage space 308 are fuselage tanks 309, i.e. below the cabin 306, while tail tanks 311 are provided in the tail 303, and, in particular, the wing tanks 310 which hold approximately ⅔ of the entire kerosine volume are provided in the wings.

Figure 17:
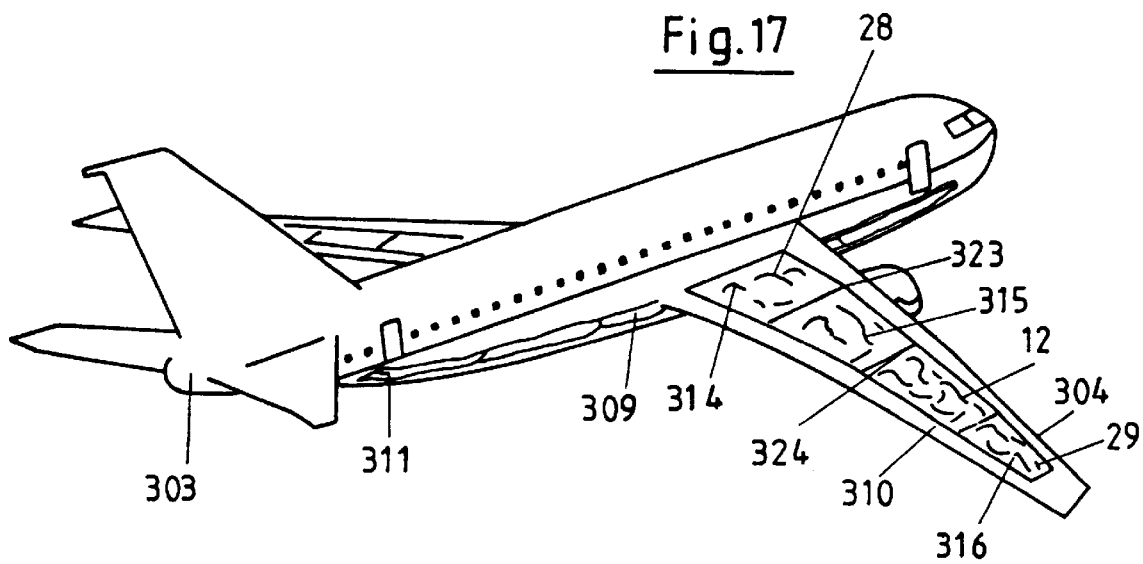
FIG. 17 shows a partial section of the aircraft seen in FIG. 16.

FIG. 17 shows in more detail that both the wing tanks 310 as well as the other tanks 309, 311 are divided into individual tanks 314, 315, 316. Each of these individual tanks 314, 315, 316 is filled with the latticework 15 consisting of glass wool 12, so that the kerosine contained in them is protected against leakage, also eliminating an explosion risk in this manner. This latticework 15 reaches up to the respective tank walls 323, 324 and completely fills the individual tanks 314, 315, 316.

Figure 18:
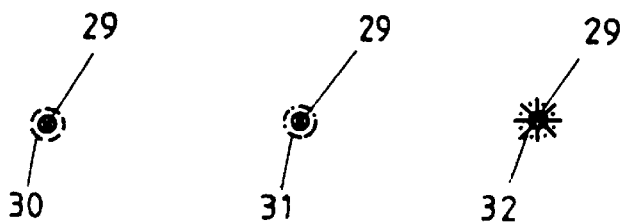
FIG. 18 shows a section of several glass fibers.

FIG. 18 shows a section of glass fibers 29, which, as has already been mentioned repeatedly, are coated with different binders 30, 31, 32.

It is useful that the individual tanks 314, 315, 316 are filled with packets 34, 35 of glass wool 12 or the latticework 15. To prevent a slipping of the individual packets, which are also surrounded by a glass fleece 341, connecting parts 348, 349 are provided on the side walls 344, 345. The connecting parts 348, 349 shown here function like a snap.

And finally, FIG. 20 shows such an individual tank 314, into which the individual packets 34, 35 have been inserted. It shows that the entire interior is completely filled with this glass wool 12, whereby double plates 326, 327, which are provided at their ends with guide parts, e.g. rollers, are arranged between it, in order to enable a pushing in of the integrated latticework, possibly with a support frame. The double plates 326, 327 are provided with outlet openings 329 which permit the flowing out of compressed air or inert gas for accelerating the emptying process.

All mentioned characteristics, including those found only in the drawings, are considered to be essential to the invention, both by themselves or in combination.

What is claimed is:

1. An apparatus for storing and transporting environmentally hazardous substances comprising a container having inlets and outlets and glass wool filling the container, further comprising an inert gas chamber in the container.

2. The apparatus of claim 1, wherein the glass wool forms a layer in the container.

3. The apparatus of claim 1, wherein the hazardous substances include gasoline, oil, hydrogen, and other fuels.

4. The apparatus of claim 1, further comprising a vehicle wherein the container is provided on the vehicle.

5. The apparatus of claim 1, wherein the glass wool has a cuttable mat-shaped latticework, said latticework being adapted to an interior of the container.

6. The apparatus of claim 5, wherein the latticework is adapted to a shape of interior walls of the container.

7. The apparatus of claim 5, wherein the latticework is adapted to shapes of parts of the container.

8. The apparatus of claim 5, further comprising clamps for clamping the mat-like latticework into an interior of the container.

9. The apparatus of claim 5, further comprising supports in the container for supporting the mat-like latticework.

10. The apparatus of claim 9, wherein the supports comprise rods.

11. The apparatus of claim 9, wherein the supports comprise walls.

12. The apparatus of claim 11, wherein the supports are of fiberglass strands.

13. The apparatus of claim 5, wherein the latticework comprises telescopic supports and sole plates forming a flexible structure for inserting into the container.

14. The apparatus of claim 5, wherein the latticework filling in the container is in layers having a decreasing volume from walls of the container towards an inside of the container.

15. The apparatus of claim 14, wherein the latticework layers have a decreasing volume density (raw density).

16. The apparatus of claim 1, further comprising a coating on the glass wool, said coating comprising 7–10 wt. % of a binder consisting of silicone and starch or epoxy resin.

17. The apparatus of claim 1, wherein the glass wool is shaped and has a volume density (raw density) of 18 to 110 kg/m$^3$.

18. The apparatus of claim 17, wherein the volume density is 40 to 65 kg/m$^3$.

19. The apparatus of claim 1, wherein the glass wool is a latticework consisting of glass fibers (soft glass wool).

20. The apparatus of claim 19, wherein the glass fibers have a fiber diameter of 3 to 7 $\mu$m.

21. The apparatus of claim 1, further comprising a thin glass fleece layer on the glass wool.

22. The apparatus of claim 1, further comprising bands of glass fibers on the glass wool.

23. An apparatus for storing and transporting environmentally hazardous substances comprising a container having inlets and outlets and glass wool filling the container, further comprising a coating on the glass wool, said coating comprising a binder, a resin, a hardener, methylpolysilane, a dust-collecting agent, and silicone.

24. The apparatus of claim 23, wherein the binder is a long-chained starch.

25. The apparatus of claim 24, wherein the long-chained starch is polysaccharides.

26. The apparatus of claim 23, wherein the resin is selected from a group consisting of epoxy or methylon resins.

27. The apparatus of claim 23, wherein the silicone is silicone resin.

28. The apparatus of claim 23, further comprising a binder additive added to the resin.

29. The apparatus of claim 28, wherein the binder additive is silane.

30. An apparatus for storing and transporting environmentally hazardous substances comprising a container having inlets and outlets and glass wool filling the container, further comprising a compressed air source connected to the container.

31. The apparatus of claim 30, wherein the air source is inert gas.

32. A safety apparatus for oil tankers and ships for storing and transporting hazardous material comprising a container and glass wool filling in the container, further comprising a latticework of glass fibers surrounding walls of the ships, wherein the latticework has a hydrophobic binder coating.

33. The apparatus of claim 32, wherein the glass wool is formed as a mat-shaped latticework.

34. The apparatus of claim 33, wherein the latticework fills interiors of compartmental tank spaces of operating oil tanks, coffers, dividing walls, double walls, as well as a bottom of a bilge.

35. The apparatus of claim 33, further comprising hazardous material in the container, and a protective mantle of latticework lining the container.

36. The apparatus of claim 35, further comprising a sheet metal layer surrounding the latticework.

37. The apparatus of claim 35, further comprising a plastic layer surrounding the latticework.

38. The apparatus of claim 35, further comprising a fiberglass layer surrounding the latticework.

39. The apparatus of claim 35, wherein the mantle is perforated on a side exposed to the hazardous material.

40. The apparatus of claim 35, wherein the protective mantle has first and second chambers, the first chamber facing the hazardous material being filled with a latticework of hydrophilic material, and the second chamber being filled with a latticework of hydrophobic material.

41. The apparatus of claim 32, further comprising supports formed as pipes having cross-bores, and loading and unloading devices connected to the container and the supports.

42. The apparatus of claim 32, further comprising barrier chambers on outer sides of the container, outward opening flaps closing the barrier chambers, a centrifugal device in the barrier chambers, and oil barriers formed as latticework of rolled glass mats in the chambers.

43. The apparatus of claim 32, further comprising plural tanks, each tank having packages of glass fibers, a cooling mantle surrounding the tanks, and mats of glass fibers surrounding the mantle.

* * * * *